(12) United States Patent
Rahman

(10) Patent No.: US 10,652,249 B2
(45) Date of Patent: May 12, 2020

(54) REMOTE LOCKING A MULTI-USER DEVICE TO A SET OF USERS

(71) Applicant: Microsoft Technology Licensing, LLC, Redmond, WA (US)

(72) Inventor: Mizanur Rahman, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 179 days.

(21) Appl. No.: 15/799,485

(22) Filed: Oct. 31, 2017

(65) Prior Publication Data

US 2019/0132324 A1 May 2, 2019

(51) Int. Cl.
*H04L 29/06* (2006.01)
*G06F 21/88* (2013.01)
*H04W 12/08* (2009.01)
*H04W 12/12* (2009.01)

(52) U.S. Cl.
CPC ............ *H04L 63/102* (2013.01); *G06F 21/88* (2013.01); *H04L 63/083* (2013.01); *H04L 63/101* (2013.01); *H04W 12/08* (2013.01); *H04W 12/0802* (2019.01); *H04W 12/12* (2013.01); *H04W 12/1206* (2019.01)

(58) Field of Classification Search
CPC ............................ H04L 63/102; H04L 63/083
See application file for complete search history.

(56) References Cited

U.S. PATENT DOCUMENTS 8,248,237 B2 8/2012 Fitzgerald et al.
2005/0131832 A1* 6/2005 Fransdonk ............ G06F 21/10
705/59

(Continued)

FOREIGN PATENT DOCUMENTS

EP 2422539 A1 2/2012
WO 2010121663 A1 10/2010

OTHER PUBLICATIONS

"International Search Report and Written Opinion Issued in PCT Application No. PCT/US2018/056818", dated Dec. 13, 2018, 14 Pages.

(Continued)

*Primary Examiner* — Ali Shayanfar
(74) *Attorney, Agent, or Firm* — Ray Quinney & Nebeker; Tiffany Healy

(57) ABSTRACT

Methods and devices for restricting access to a computer device may include receiving a lost device message including a device identifier identifying the computer device and an authorized user list including at least one user identification that identifies a user authorized to access the computer device in a lost state. The methods and devices may include logging out existing users on the computer device and invalidate the existing users' credentials on the computer device based at least one receiving the lost device message. The methods and devices may include activating a lock screen on the computer device and setting the computer device to the lost state. The methods and devices may include initiating a log on manager that is configured to recognize the lost state and to restrict access to the computer device to users included in the authorized user list.

19 Claims, 7 Drawing Sheets

(56) References Cited

U.S. PATENT DOCUMENTS

| | | | |
|---|---|---|---|
| 2005/0257055 A1* | 11/2005 | Anderson | H04L 63/0442 713/170 |
| 2006/0013197 A1* | 1/2006 | Anderson | H04L 63/08 370/352 |
| 2007/0190995 A1 | 8/2007 | Wang et al. | |
| 2010/0210240 A1 | 8/2010 | Mahaffey et al. | |
| 2011/0282697 A1 | 11/2011 | Fitzgerald et al. | |
| 2012/0036220 A1 | 2/2012 | Dare et al. | |
| 2012/0196571 A1 | 8/2012 | Grkov et al. | |
| 2013/0326642 A1 | 12/2013 | Hajj et al. | |
| 2013/0340057 A1* | 12/2013 | Kitlyar | G06F 21/36 726/6 |
| 2014/0022920 A1* | 1/2014 | Dua | H04W 4/021 370/252 |
| 2014/0195927 A1 | 7/2014 | Deweese et al. | |
| 2014/0298421 A1* | 10/2014 | Johnson | H04L 63/083 726/4 |
| 2015/0281196 A1* | 10/2015 | Sharma | H04L 63/08 713/151 |
| 2015/0324617 A1 | 11/2015 | Pai et al. | |
| 2016/0119326 A1* | 4/2016 | Miller | G06F 21/41 726/8 |
| 2016/0205746 A1* | 7/2016 | Kumar | H05B 37/0227 315/297 |
| 2016/0360406 A1* | 12/2016 | Shen | H04M 1/7253 |
| 2017/0083882 A1* | 3/2017 | Kim | G06Q 20/102 |
| 2017/0164204 A1 | 6/2017 | Fitzgerald et al. | |
| 2018/0077533 A1* | 3/2018 | Pandharipande | H04W 4/029 |

OTHER PUBLICATIONS

"Phone Away app lets you access your Android phone remotely", Retrieved From <<http://gadgets.ndtv.com/apps/news/phone-away-app-lets-you-access-your-android-phone-remotely-433086>>, Oct. 16, 2013, 5 Pages.

Whitney, Lance, "Android users can now lock their lost devices remotely", Retrieved from <<https://www.cnet.com/news/android-users-can-now-lock-their-lost-devices-remotely/>>, Sep. 24, 2013, 2 Pages.

* cited by examiner

REMOTE LOCKING A MULTI-USER DEVICE TO A SET OF USERS

BACKGROUND

The present disclosure relates to devices and methods of remote locking a device.

When an owner loses a multi-user computing device, the owner may not have full capability to remotely set the device to a state that protects the device from unauthorized access, including preventing access by other users on the device who were previously authorized to access the device. Current market solutions for protecting access to a lost or stolen device is limited to basic location tracking, restricting access to a single user, and erasing the device memory remotely.

Thus, there is a need in the art for improvements in devices and methods of remote locking a device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system in communication with the memory and the processer, wherein the operating system is operable to: receive a lost device message including a device identifier identifying the computer device and an authorized user list including at least one user identification that identifies a user authorized to access the computer device in a lost state; log out existing users' on the computer device and invalidate the existing users credentials on the computer device based at least on receiving the lost device message; activate a lock screen on the computer device and set the computer device to the lost state; initiate a log on manager that is configured to recognize the lost state and to restrict access to the computer device to users included in the authorized user list; receive, at the log on manager, at least one log on attempt from a user utilizing a user identification and a password; perform, at the computer device, a first comparison of the received user identification with the at least one user identification included in the authorized user list to generate a first authentication of the received user identification when a match occurs between the received user identification and the at least one user identification included in the authorized user list; transmit the received user identification and the password when the first authentication occurs to perform a second comparison of the received user identification and the password with stored credentials on a network based server for a second authentication of the received user identification and the password; and grant access to the computer device based at least on the first authentication and the second authentication.

Another example implementation relates to a method for restricting access to a computer device. The method may include receiving, at an operating system on the computer device, a lost device message including a device identifier identifying the computer device and an authorized user list including at least one user identification that identifies a user authorized to access the computer device in a lost state. The method may include logging out existing users on the computer device and invalidate the existing users' credentials on the computer device based at least one receiving the lost device message. The method may include activating a lock screen on the computer device and setting the computer device to the lost state. The method may include initiating a log on manager that is configured to recognize the lost state and to restrict access to the computer device to users included in the authorized user list. The method may include receiving, at the log on manager, at least one log on attempt from a user utilizing a user identification and a password. The method may include performing, at the computer device, a first comparison of the received user identification with the at least one user identification included in the authorized user list to generate a first authentication of the received user identification when a match occurs between the received user identification and the at least one user identification included in the authorized user list. The method may include transmitting the received user identification and the password when the first authentication occurs to perform a second comparison of the received user identification and the password with stored credentials on a network based server for a second authentication of the received user identification and the password. The method may include granting access to the computer device based at least on the first authentication and the second authentication.

Another example implementation relates to a server comprising memory configured to store data and instructions and at least one processor configured to communicate with the memory. The server may also include a lost mode manager component, an authorized user manager component, and a notification component configured to communicate with the memory and the processor, operable to: receive a lost device notice identifying a lost computer device; receive at least one user authorized to access the computer device; create an authorized user list including at least one user identification that identifies the at least one user authorized to access the computer device in a lost state; and send a lost device message including a device identifier identifying the computer device and an authorized user list including the at least one user identification that identifies a user authorized to access the computer device in a lost state to the computer device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
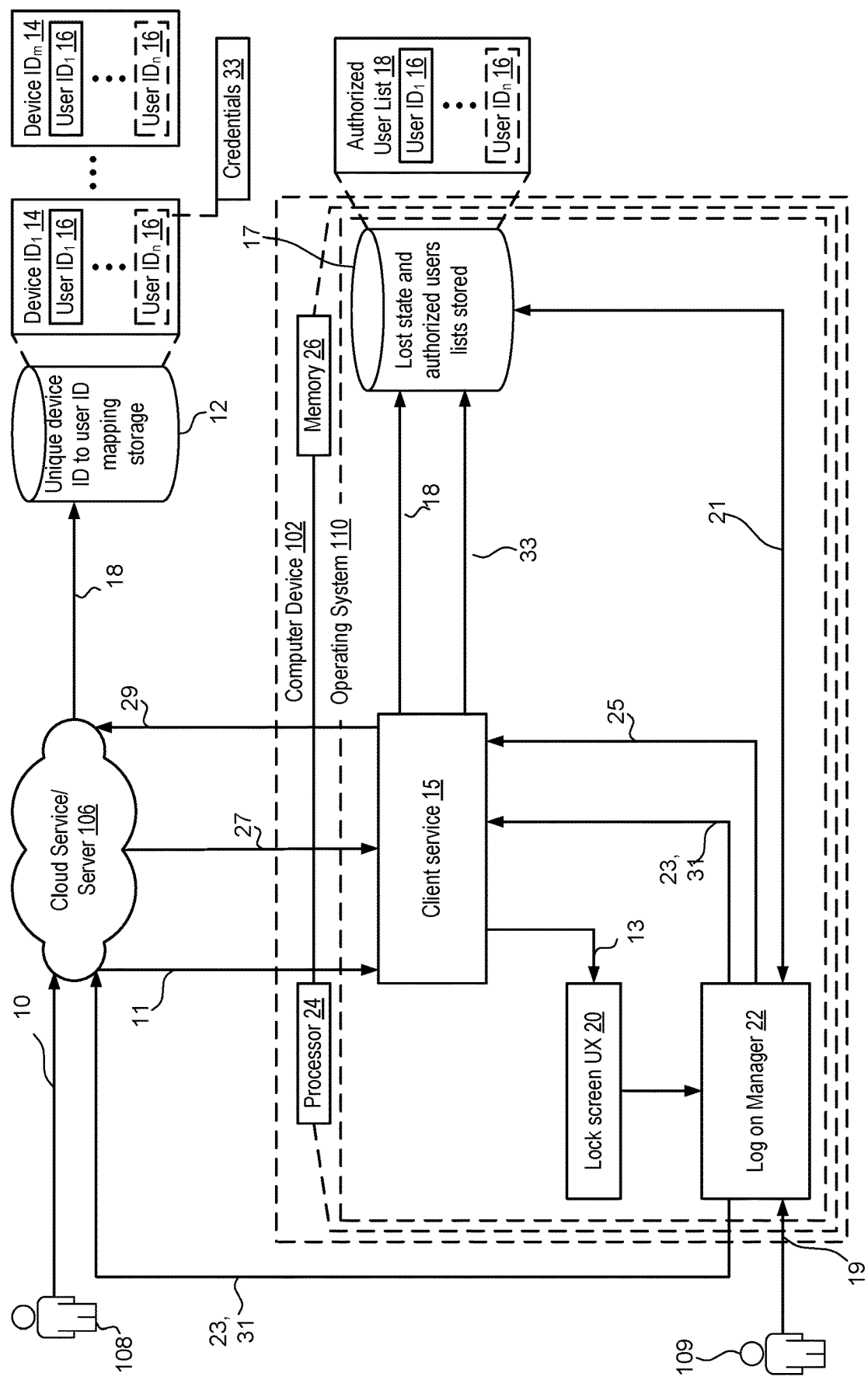
FIG. 1 is a schematic block diagram of an example computer device in communication with an example server in accordance with an implementation.

This disclosure relates to devices and methods for remotely initiating and/or identifying a device as lost or in a stolen state and preventing unauthorized access to the device. The device may be a multi-user device where multiple users may log into the device. The devices and methods may perform various actions on a device to prevent unauthorized access to the device by, for example, limiting access to the device to a set of authorized users of the device. For example, a user, such as an administrator and/or device owner, may lock a device remotely to a set of authorized users or a single user by accessing a user account through a web interface. Authorized users may be defined based on a cloud based account which may authenticate users, for example, using credentials of the users. The user (e.g., an administrator and/or a device owner) may identify which users or user accounts may be authorized to log into a device when the device is located. The identified set of users or user may be existing users on the device or a new user account which may be authenticated with a cloud based credential.

Once the user identifies the set of authorized users who may access the device, a lost device protocol message may be sent to the device, for example, using a predefined delivery mechanism. The predefined delivery mechanism may be device specific based on how a device may be configured to connect to a network. The lost device protocol message may include, for example, a device identification (ID) corresponding to the device and user IDs for all the authorized users. The device may receive the lost device protocol message and may log out any logged in users and may initiate a special lock screen immediately. The device may also be set to a lost mode state and may store the received authorized user list, for example, in a secure storage location on the device. In addition, the device may invalidate all stored and cached credential of the existing users on the device.

The special lock screen may provide some guidance on who locked the device and how the device may be unlocked from the lost mode state. A device log on mechanism may recognize the lost mode state and the set of authorized users and may curate and restrict log in attempts to only the authorized set of users listed in the secure device store. In addition, the device log on mechanism may initiate a device reboot and erase device storage according to existing failed log in attempt policies.

When an authorized user logs into the device, a successful log in may be reported to the client service on the device and the device may be set to a found state. In addition, the device may restore other existing user access.

An administrator of a device and/or device owner may be able to remotely control and/or update which users may access the device when the device is lost or stolen. As such, the devices and methods may provide the ability to protect user data on lost or stolen devices by controlling a lost or stolen device remotely. In addition, the devices and methods may enhance device security by limiting unauthorized access when a device is lost or stolen.

Figure 2:
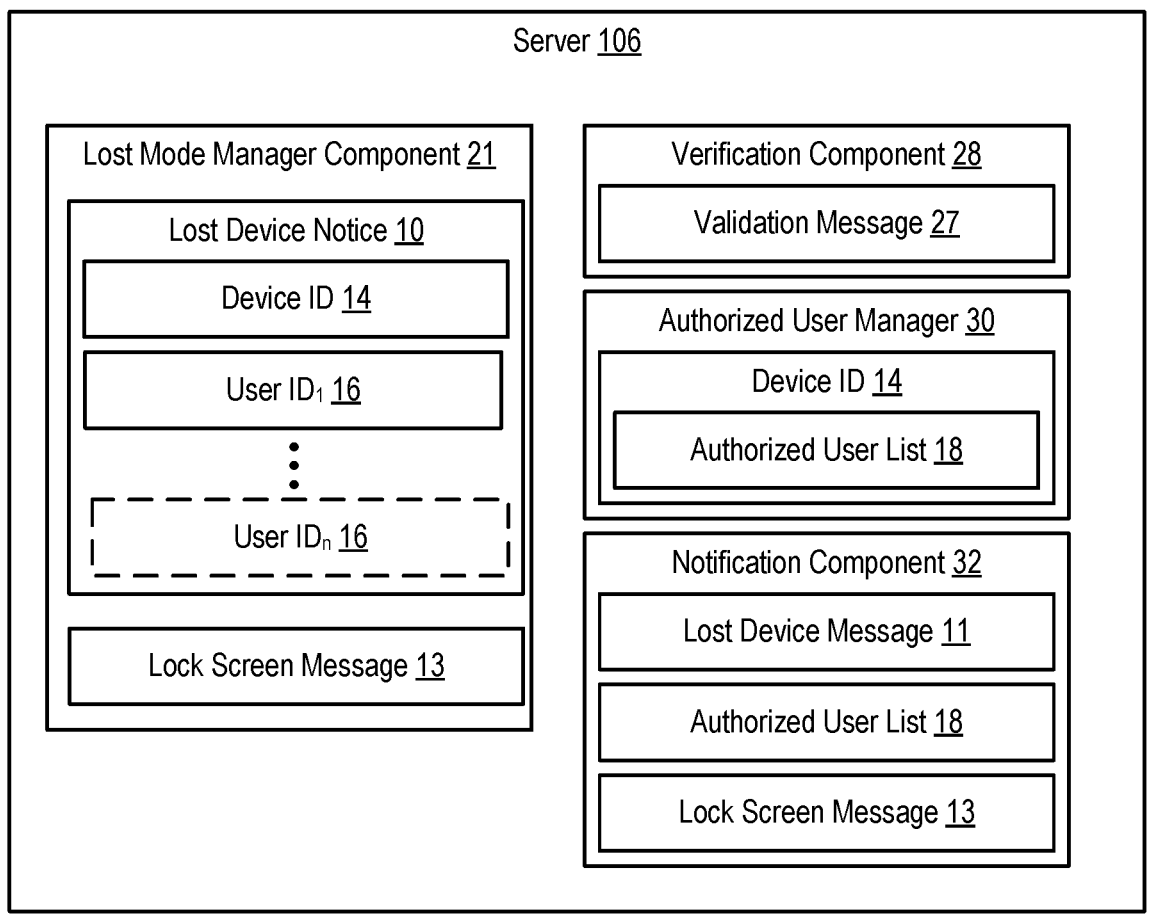
FIG. 2 is a schematic block diagram of an example server in accordance with an implementation.
Figure 3:
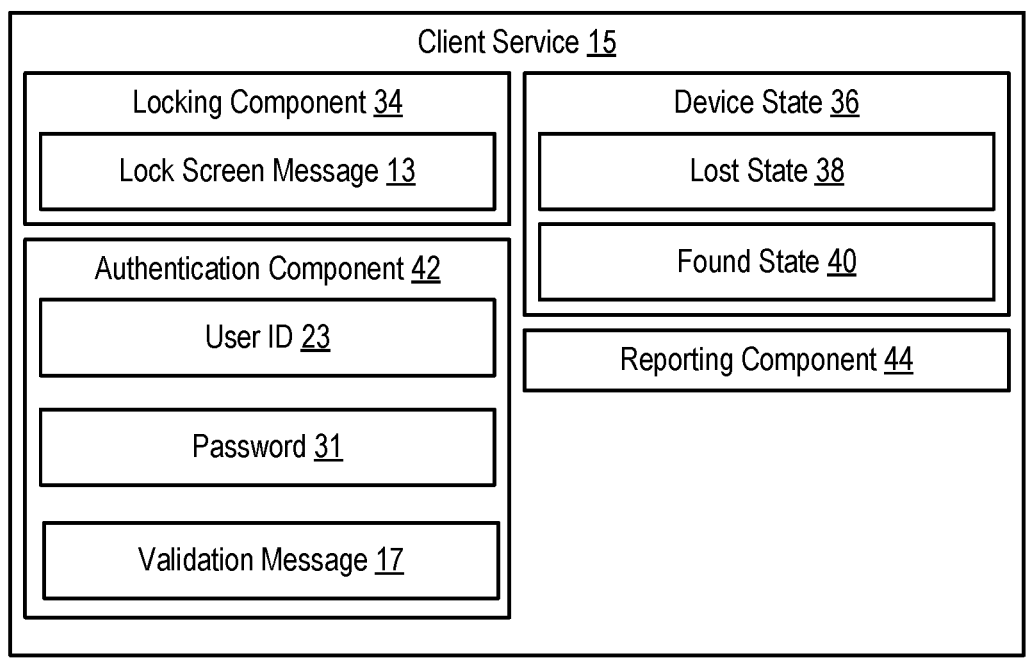
FIG. 3 is a schematic block diagram of an example client service for use with a computer device in accordance with an implementation.

Referring now to FIGS. 1-3, illustrated therein is an example computer device 102 and server 106 for use with remotely initiating and/or identifying a device as lost or in a stolen state and locking the device remotely. A user 108, such as, but not limited to an administrator of a computer device and/or owner of a computer device, may access a cloud service and/or server 106 through a user account when a computer device associated with user 108 may be lost and/or stolen. For example, user 108 may access a lost mode manager component 21 to remotely lock a lost or stolen computer device. User 108 may use lost mode manager component 21 to provide a lost device notice 10 identifying a lost or stolen computer device to the cloud service and/or server 106. In the illustrated example, the lost or stolen computer device may be computer device 102. In an implementation, computer device 102 may be a multi-user device that a plurality of users may be able to log into and/or may have a plurality of user accounts on computer device 102. For example, a multi-user device may be a device where multiple user may log in to use the device using a unique identity. In addition, a multi-user device may include multiple device owners and/or administrators that may have full management capabilities on the device. Computer device 102 may include any mobile or fixed computer device, which may be connectable to a network. Computer device 102 may be, for example, a computer device such as a desktop or laptop or tablet computer, an internet of things (TOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

The lost device notice 10 may include, for example, a device identification (ID) 14 corresponding to computer device 102 and identifying computer device 102 as the lost computer device. In addition, the lost device notice 10 may identify one or more authorized users IDs 16 selected by user 108 that may access computer device 102. For instance, information relating to one or more individuals associated with computer device 102 may be presented on a user interface to user 108. For example, the one or more individuals may have a user account on computer device 102. User 108 may select one or more individuals as authorized users who may access computer device 102. In addition, user 108 may add a new user to the list of authorized users to access computer device 102. User 108 may create the lost device notice 10 when user 108 is unable to locate computer device 102 and/or when user 108 may suspect that computer device 102 was stolen.

User 108 may also use lost mode manager component 21 to create a customized and/or special lock screen message 13 to present on computer device 102 to any individual that may attempt to access computer device 102. For example, the lock screen message 13 may provide information regarding who initiated the lock screen and may provide instructions for unlocking computer device 102.

Lost mode manager component 21 may communicate with an authorized user manager component 30 (FIG. 2) that may receive the one or more authorized users selected by user 108 and may generate an authorized user list 18 for computer device 102. In addition, authorized user manager component 30 may access a data store 12 to store the authorized user list 18. Each authorized user list 18 may be associated with the corresponding device ID 14. As such, data store 12 may include a plurality of device IDs 14 (e.g., up to m, where m is an integer) with the associated authorized user list 18. For each device ID 14, data store 12 may include at least one user ID 16 up to n (where n is an integer) in the authorized user list 18. In addition, each user ID 16 may be associated with credentials 33, such as, but not limited to, a password used to access a user account. The credentials 33 may be device specific (e.g., a user may have a different password for accessing different devices). In addition, a user may use the same credentials 33 to access a variety of devices (e.g., the user may use the same password to access a user account on different devices). As such, data store 12 may store the authorized user list 18 and/or any credentials 33 associated with the users included in the authorized user list 18.

Server 106 may also include a notification component 32 (FIG. 2) that may generate and send one or more messages to computer device 102. For example, notification component 32 may send a lost device message 11 to computer device 102 notifying computer device 102 of the lost device state. The lost device message 11 may be a protocol message sent to computer device 102 using a predefined delivery mechanism. The predefined delivery mechanism may be device specific based on how a device may be configured to connect to a network. For example, a mobile device with cell connectivity may receive the lost device message 11 using a data connection. A Short Message Service (SMS) or a Wireless Fidelity (Wi-Fi) connected device may receive the lost device message 11 using an operating system (OS) defined command channel. For a Windows device, the device may receive the lost device message 11 using a Windows notification channel. In addition, the lost device message 11 may include the device ID 14 for computer device 102 and the authorized user list 18 with the user IDs 16 identifying the authorized users who may access the computer device 102.

Computer device 102 may include an operating system 110 executed by processor 24 and/or system memory 26 of computer device 102. System memory 26 may be configured for storing data and/or computer-executable instructions defining and/or associated with operating system 110, and processor 24 may execute operating system 110. An example of system memory 26 can include, but is not limited to, a type of memory usable by a computer, such as random access memory (RAM), read only memory (ROM), tapes, magnetic discs, optical discs, volatile memory, non-volatile memory, and any combination thereof. An example of processor 24 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include a client service 15 that may receive the lost device message 11 and may initiate locking of computer device 102. For example, client service 15 may receive a secure token with the lost device message 11 that client service 15 may use to authenticate the lost device message 11. Client service 15 may include a locking component 34 (FIG. 3) that may logout any users currently using computer device 102 and may send a lock screen message 13 to activate a lock screen 20 when client service 15 receives and authenticates the lost device message 11. For example, locking component 34 may invalidate all stored and cached credentials of the existing users on computer device 102. As such, all stored and cached credentials of previous users on computer device 102 may be removed from computer device 102 and the authorized user list 18 received with the lost device message 11 may control who may access computer device 102. The lock screen message 13 may be presented to any individuals who tries to access computer device 102. In an implementation, the lock screen message 13 may be a customized message created and/or selected by user 108. For example, the lock screen message 13 may provide instructions for how to unlock computer device 102.

In addition, client service 15 may track a device state 36 (FIG. 3) that indicates a current state of computer device 102. For example, client service 15 may modify the device state 36 from a found state 40 (FIG. 3) to a lost state 38 (FIG. 3) upon receiving the lost device message 11.

Client service 15 may also store the received authorized user list 18 to a secure data store 17. The authorized user list 18 may be used to verify user credentials when a log on attempt occurs on computer device 102 during a lost state 38.

A special log on manager 22 may be activated when the lock screen message 13 is received. The log on manager 22 may recognize the lost state 38 of computer device 102 and may restrict log in attempts to computer device 102 to users included in the authorized user list 18 saved in data store 17. For example, log on manager 22 may allow only whitelisted or authorized users (e.g., users included in the authorized user list 18) to log into computer device 102. Computer device 102 may also require internet connectivity to validate the credentials and users ID received with server 106. In addition, log on manager 22 may initiate a device reboot and may erase device storage according to, for example, existing failed log in attempt policies.

A user 109 may perform a log in attempt 19 to access computer device 102 by accessing the log on manager 22. For example, user 109 may enter in a user ID 23 and/or password 31 to attempt to access computer device 102. The entered user ID 23 may be compared with the user IDs 16 stored in the authorized user list 18, when a match occurs (e.g., user ID 23 matches a user ID 16 in the authorized user list 18), user ID 23 and/or password 31 may be transmitted to server 106 for further authentication. In an implementation, user ID 23 and/or password 31, may be transmitted to server 106 via client service 15. For example, log on manager 22 may transmit user ID 23 and/or password 31 to client service 15. Client service 15 may include an authentication component 42 (FIG. 3) that may communicate user ID 23 and/or password 31 to server 106 and may also receive a validation message 27 from server 106 indicating whether user ID 23 is authorized to access computer device 102.

Server 106 may include a verification component 28 (FIG. 2) that verifies authorized users that may access computer device 102. For example, verification component 28 may compare user ID 23 with the list of user IDs 16 authorized to access computer device 102 stored in data store 12. In an implementation, user 108 may have updated and/or changed the authorized user list 18 for computer device 102. For example, user 108 may have added and/or removed user IDs 16 from the authorized user list 18. As such, the authorized user list 18 may dynamically change. Verification component 28 may access the most recent list of users IDs 16 authorized to access computer device 102 when performing the verification. In addition, verification component 28 may compare password 31 with credentials 33 associated with the user IDs 16.

When a match occurs (e.g., user ID 23 matches a user ID 16 included in the authorized user list 18 and password 31 matches a stored credential 33 associated with the user ID 16), verification component 28 may send a validation message 27 to client service 15 indicating that user 109 is authorized to access computer device 102. When a match does not occur (e.g., user ID 23 does not match a user ID 16 included in the authorized user list 18 and/or password 31 does not match credentials 33), verification component 28 may indicate in validation message 27 that user 109 may not access computer device 102.

When the validation message 27 indicates that user 109 is authorized to access computer device 102, log on manager 22 may provide user 109 access to computer device 102. Log on manger 22 may report a successful log on 25 to client service 15. Client service 15 may update the device state 36 to a found state 40 and may restore other user access to computer device 102. In addition, client service 15 may include a reporting component 44 that sends a report 29 to server 106 a successful sign in occurred to computer device 102.

When the validation message 27 indicates that user ID 23 is not authorized to access computer device 102, client service 15 may restrict access to computer device 102.

As such, user 108 may remotely lock computer device 102 and may restrict access to computer device 102 to a set of authorized users to protect user data on lost or stolen devices by controlling a lost or stolen device remotely. In addition, the devices and methods may enhance device security by limiting unauthorized access when a device is lost or stolen.

Figure 4:
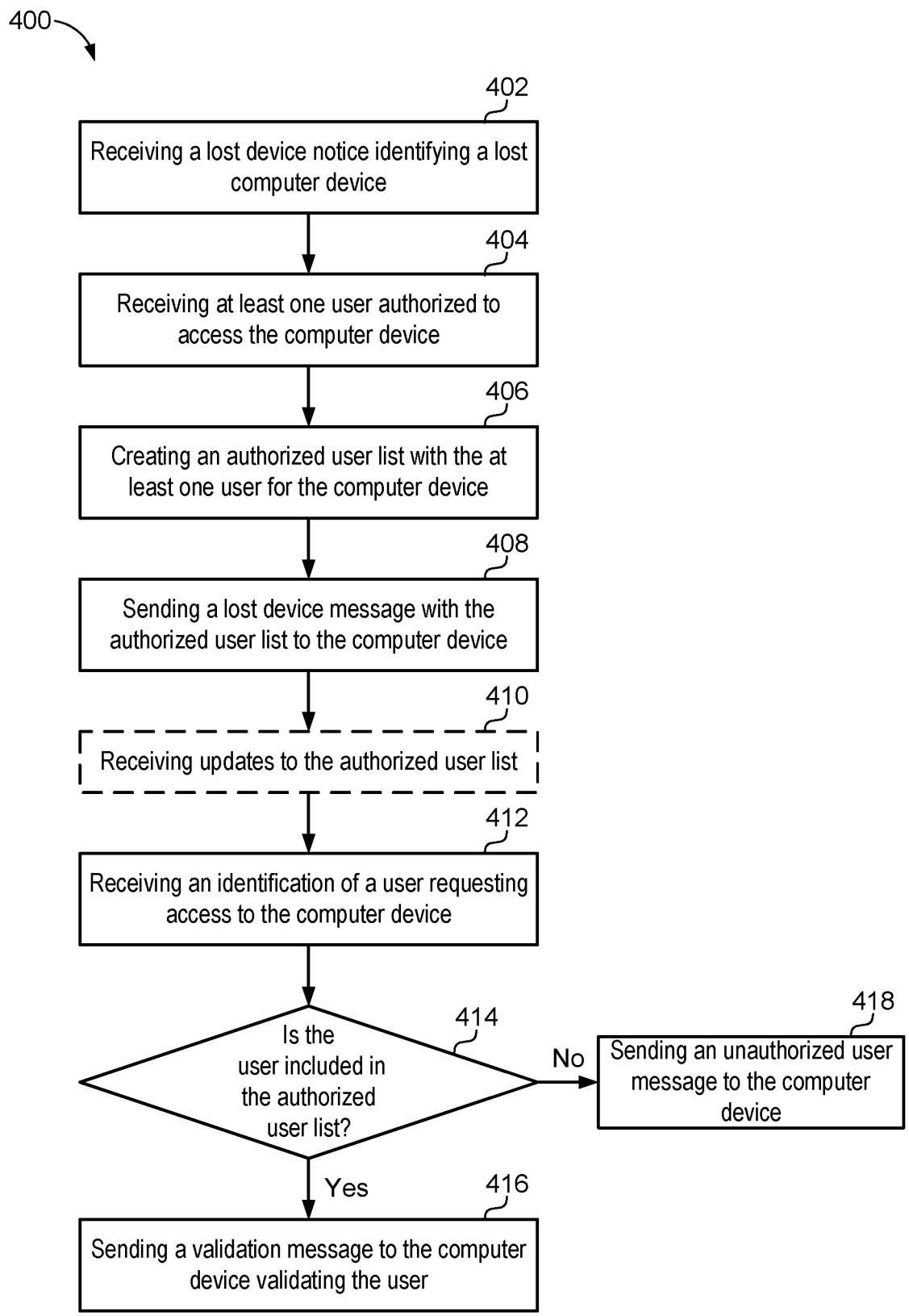
FIG. 4 is a flow diagram of an example of a method of remote locking a computer device to an authorized set of users in accordance with an implementation.

Referring now to FIG. 4, an example method 400 may be used by cloud service and/or server 106 (FIG. 1) to remote lock a computer device 102 (FIG. 1) to an authorized user list 18 (FIG. 1). The actions of method 400 may be discussed below with reference to the architecture of FIG. 1 and/or the components of server 106 of FIG. 2.

At 402, method 400 may include receiving a lost device notice identifying a lost computer device. A user 108 (FIG. 1), such as, but not limited to an administrator of a computer device and/or owner of a computer device, may access a cloud service and/or server 106 through a user account when a computer device associated with user 108 may be lost and/or stolen. For example, user 108 may access a lost mode manager component 21 to remotely lock a lost or stolen computer device. User 108 may use lost mode manager component 21 to provide a lost device notice 10 identifying a lost or stolen computer device 102 to the cloud service and/or server 106. For example, the lost device notice 10 may include a device identification (ID) 14 corresponding to computer device 102 and identifying computer device 102 as the lost computer device. In an implementation, computer device 102 may be a multi-user device that a plurality of users may be able to log into and/or may have a plurality of user accounts on computer device 102.

At 404, method 400 may include receiving at least one user authorized to access the computer device. User 108 may select one or more individuals as authorized users who may access computer device 102. For example, one or more individuals associated with computer device 102 (e.g., individuals that may have a user account on computer device 102) may be presented to user 108. In addition, user 108 may add a new user to the list of authorized users to access computer device 102. The lost device notice 10 may identify one or more authorized users IDs 16 selected by user 108 that may access computer device 102. User 108 may create the lost device notice 10 when user 108 is unable to locate computer device 102 and/or when user 108 may suspect that computer device 102 was stolen.

At 406, method 400 may include creating an authorized user list with the at least one user for the computer device. An authorized user manager component 30 (FIG. 2) may receive the one or more authorized users selected by user 108 and may generate an authorized user list 18 for computer device 102. In addition, authorized user manager component 30 may access a data store 12 (FIG. 1) to store the authorized user list 18. Each authorized user list 18 may be associated with the corresponding device ID 14. As such, data store 12 may include a plurality of device IDs 14 (e.g., up to m, where m is an integer) with the associated authorized user list 18. For each device ID 14, data store 12 may include at least one user ID 16 up to n (where n is an integer) in the authorized user list 18. In addition, each user ID 16 may be associated with credentials 33, such as, but not limited to, a password used to access a user account. The credentials 33 may be device specific (e.g., a user may have a different password for accessing different devices). In addition, the same credentials 33 may be used by a user to access a variety of devices (e.g., the user may use the same password to access a user account on different devices). As such, data store 12 may store the authorized user list 18 and/or any credentials 33 associated with the users included on the authorized user list 18.

At 408, method 400 may include sending a lost device message including a device identifier identifying the computer device and an authorized user list including at least one user identification that identifies a user authorized to access the computer device in a lost state to the computer device. Server 106 may also include a notification component 32 (FIG. 2) that may generate and send one or more messages to computer device 102. For example, notification component 32 may send a lost device message 11 to computer device 102 notifying computer device 102 of the lost device state. The lost device message 11 may be a protocol message sent to computer device 102 using a predefined delivery mechanism. The predefined delivery mechanism may be device specific based on how a device may be configured to connect to a network. For example, a mobile device with cell connectivity may receive the lost device message 11 using a data connection. A SMS or a Wi-Fi connected device may receive the lost device message 11 using an operating system (OS) defined command channel. For a Windows device, the device may receive the lost device message 11 using a Windows notification channel. In addition, the lost device message 11 may include the device ID 14 for computer device 102 and the authorized user list 18 with the user IDs 16 identifying the authorized users who may access the computer device 102 in a lost state.

At 410, method 400 may optionally include receiving updates to the authorized user list. User 108 may have updated and/or changed the authorized user list 18 for computer device 102. For example, user 108 may have added and/or removed user IDs 16 from the authorized user list 18. As such, the authorized user list 18 may dynamically change.

At 412, method 400 may include receiving an identification of a user requesting access to the computer device. Server 106 may include a verification component 28 (FIG. 2) that receives a user ID 23 and/or password 31 for a user requesting access to computer device 102.

At 414, method 400 may include determining whether the user is included in the authorized user list. Verification component 28 may verify authorized users that may access computer device 102. For example, verification component 28 may compare a user ID 23 received for a user requesting access to computer device 102 with the list of user IDs 16 authorized to access computer device 102 stored in data store 12. Verification component 28 may access the most recent list of users IDs 16 authorized to access computer device 102 when performing the verification. In addition, verification component 28 may compare password 31 with credentials 33 associated with the user IDs 16.

At 416, method 400 may include sending a validation message to the computer device validating the user. When a match occurs (e.g., user ID 23 matches a user ID 16 included in the authorized user list 18 and password 31 matches a stored credential 33 associated with the user ID 16), verification component 28 may send a validation message 27 to client service 15 indicating that the user is authorized to access computer device 102.

At 418, method 400 may include sending an unauthorized user message to the computer device. When a match does not occur (e.g., user ID 23 does not match a user ID 16 included in the authorized user list 18 and/or password does not match credentials 33), verification component 28 may indicate in validation message 27 that the user may not access computer device 102.

As such, a user may remotely initiate and/or identify a device as lost or in a stolen state and prevent unauthorized access to the device. The user may lock the device remotely to a set of authorized users or a single user, and thus, restricting access to the device to prevent unauthorized access to the device by.

Figure 5:
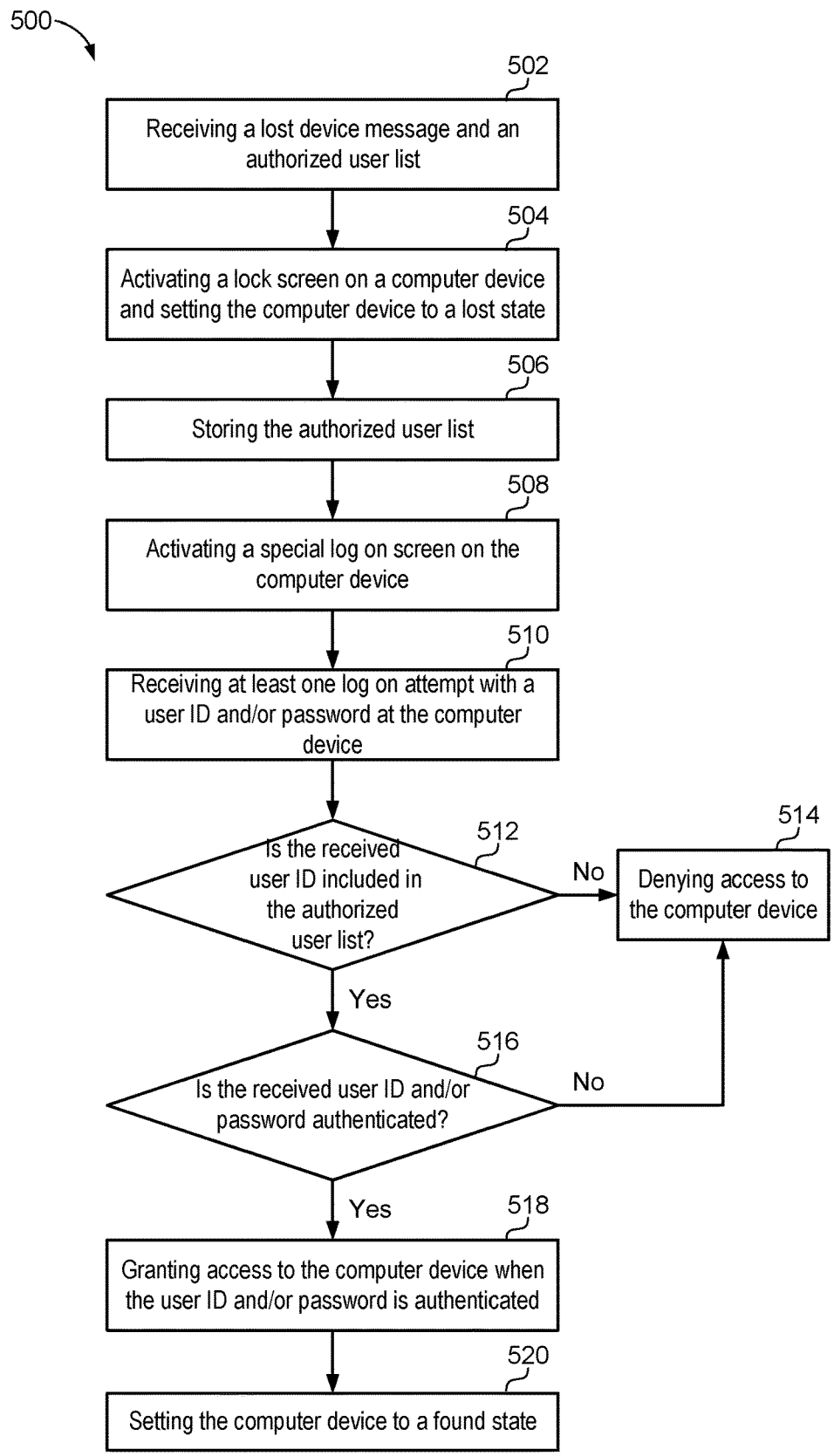
FIG. 5 is a flow diagram of an example of a method of restricting access to a computer device in accordance with an implementation.

Referring now to FIG. 5, an example method 500 may be used by computer device (FIG. 1) and/or client service 15 (FIG. 1) to restrict access to computer device 102 (FIG. 1). The actions of method 500 may be discussed below with reference to the architecture of FIG. 1 and/or the components of client service 15 of FIG. 3. In an implementation, computer device 102 may be a multi-user device where multiple user may log in to use device 102 using a unique identity. In addition, a multi-user device may include multiple device owners and/or administrators that may have full management capabilities on device 102.

At 502, method 500 may include receiving a lost device message including a device identifier identifying the computer device and an authorized user list including at least one user identification that identifies a user authorized to access the computer device in a lost state. For example, a client service 15 (FIG. 1) may receive the lost device message 11 and may initiate locking of computer device 102. For example, client service 15 may receive a secure token with the lost device message 11 that client service 15 may use to authenticate the lost device message 11. The lost device message 11 may notify computer device 102 of the lost device state. The lost device message 11 may be a protocol message sent to computer device 102 using a predefined delivery mechanism. The predefined delivery mechanism may be device specific based on how a device may be configured to connect to a network. For example, a mobile device with cell connectivity may receive the lost device message 11 using a data connection. A SMS or a Wi-Fi connected device may receive the lost device message 11 using an operating system (OS) defined command channel. For a Windows device, the device may receive the lost device message 11 using a Windows notification channel. In addition, the lost device message 11 may include the device ID 14 for computer device 102 and the authorized user list 18 with the user IDs 16 identifying the authorized users who may access the computer device 102.

At 504, method 500 may include activating a lock screen on a computer device and setting the computer device to a lost state. Client service 15 may include a locking component 34 (FIG. 3) that may logout any existing users of computer device 102 and may send a lock screen message 13 to activate a lock screen 20 when client service 15 receives the lost device message 11. For example, locking component 34 may invalidate all stored and cached credentials of the existing users on computer device 102. As such, all stored and cached credentials of existing users on computer device 102 may be removed from computer device 102 and the authorized user list 18 received with the lost device message 11 may control who may access computer device 102. The lock screen message 13 may be presented to any individuals who tries to access computer device 102. In an implementation, the lock screen message 13 may be a customized message created and/or selected by user 108. For example, the lock screen message 13 may provide instructions for how to unlock computer device 102.

In addition, client service 15 may track a device state 36 (FIG. 3) that indicates a current state of computer device 102. For example, client service 15 may modify the device state 36 from a found state 40 (FIG. 3) to a lost state 38 (FIG. 3) upon receiving the lost device message 11.

At 506, method 500 may include storing the authorized user list. Client service 15 may also store the received authorized user list 18 to a secure data store 17. The authorized user list 18 may be used to verify user credentials when a log on attempt occurs on computer device 102 during a lost state 38.

At 508, method 500 may include activating a special log on screen on the computer device. A special log on manager 22 may be initiated when the lock screen message 13 is received. The log on manager 22 may recognize the lost state 38 of computer device 102 and may restrict log in attempts to computer device 102 to users included in the authorized user list 18 saved in data store 17. For example, log on manager 22 may allow only whitelisted or authorized users (e.g., users included in the authorized user list 18) to log into computer device 102. Computer device 102 may also require internet connectivity to validate the credentials and users ID received with server 106 (FIG. 1). In addition, log on manager 22 may initiate a device reboot and may erase device storage according to, for example, existing failed log in attempt policies.

At 510, method 500 may include receiving at least one log on attempt with a user ID at the computer device. The log on manager 22 may receive a log in attempt 19 to access computer device 102 by user 109. For example, user 109 may enter in a user ID 23 and/or password 31 to attempt to access computer device 102.

At 512, method 500 may include determining whether the received user ID is included in the authorized user list stored on the computer device. For example, the log on manger 22 may compare the entered user ID 23 with the user IDs 16 stored in the authorized user list 18.

At 514, method 500 may include denying access to the computer device when a match does not occur. For example, when log on manager 22 determines that the received user ID 23 does not match a user ID 16 in the authorized user list 18, log on manager 22 may deny access to computer device 102.

At 516, method 500 may include determining whether the received user ID is authenticated when a match occurs. When log on manager 22 determines that a match does occur (e.g., user ID 23 matches a user ID 16 in the authorized user list 18), user ID 23 and/or password 31 may be transmitted to server 106 for further authentication. In an implementation, user ID 23 and/or password 31, may be transmitted to server 106 via client service 15. For example, log on manager 22 may transmit user ID 23 and/or password 31 to client service 15. Client service 15 may include an authentication component 42 (FIG. 3) that may communicate user ID 23 and/or password 31 to server 106 and may also receive a validation message 27 from server 106 indicating whether the user is authorized to access computer device 102.

At 518, method 500 may include granting access to the computer device when the user ID and/or password 31 is authenticated. When the validation message 27 indicates that the user is authorized to access computer device 102, log on manager 22 may provide the user access to computer device 102. Log on manger 22 may report a successful log on 25 to client service 15.

At 520, the method 500 may include setting the computer device to a found state. For example, client service 15 may update the device state 36 to a found state 40 and may restore other user access to computer device 102. In addition, client service 15 may include a reporting component 44 that sends a report 29 to server 106 a successful sign in occurred to computer device 102.

When the validation message indicates that the user is not authorized to access computer device 102, at 514, method 500 may include denying access to the computer device. For example, client service 15 may restrict access to computer device 102 when the validation message 27 indicates that the user is not authorized to access computer device 102.

Thus, a two-step authentication process may occur when a user performs a log in attempt on computer device 102. A first authentication occurs locally on computer device 102 with the stored authorized user list 18, and a second authentication occurs with credentials 33 stored on a remote server 106 or other remote devices. As such, device security may be improved by using the two-step authentication process with a remote server 106.

Figure 6:
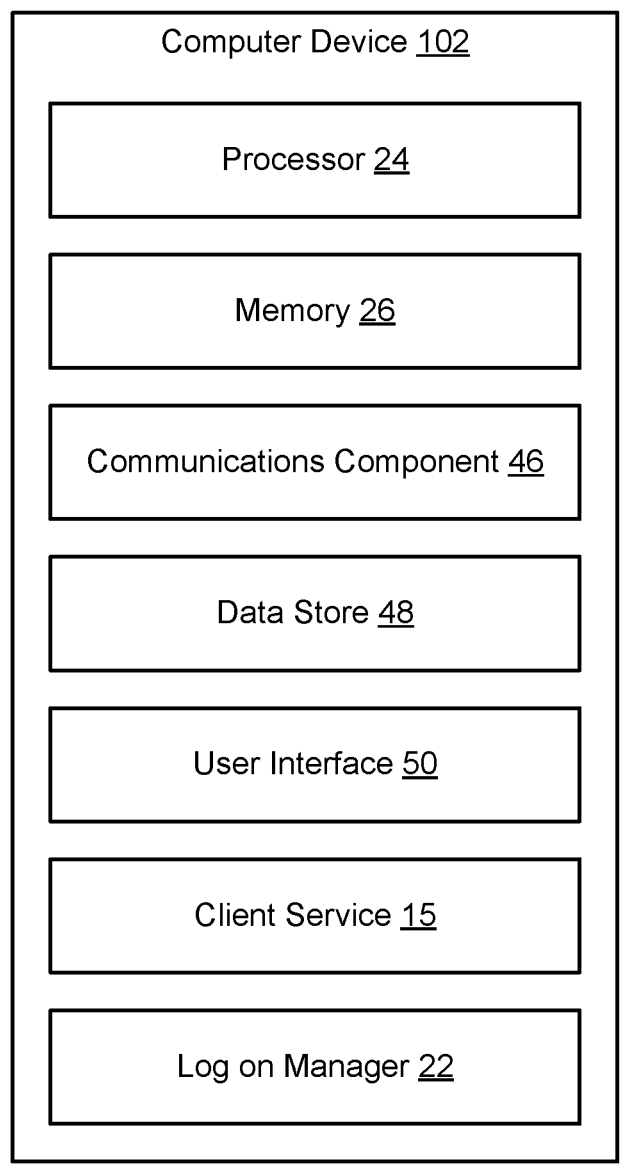
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 24 for carrying out processing functions associated with one or more of components and functions described herein. Processor 24 can include a single or multiple set of processors or multi-core processors. Moreover, processor 24 can be implemented as an integrated processing system and/or a distributed processing system.

Computer device 102 may further include memory 26, such as for storing local versions of applications being executed by processor 24. Memory 26 can include a type of memory usable by a computer, such as random access memory (RAM), read only memory (ROM), tapes, magnetic discs, optical discs, volatile memory, non-volatile memory, and any combination thereof.

Further, computer device 102 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer device 102 may include a data store 48, which can be any suitable combination of hardware and/or software, that provides for mass storage of information, databases, and programs employed in connection with implementations described herein. For example, data store 48 may be a data repository for client service 15 (FIG. 1) and/or log on manager 22 (FIG. 1).

Computer device 102 may also include a user interface component 50 operable to receive inputs from a user of computer device 102 and further operable to generate outputs for presentation to the user. User interface component 50 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of client service 15 and/or log on manager 22. In addition, processor 24 executes client service 15 and/or log on manager 22, and memory 26 or data store 48 may store them.

Figure 7:
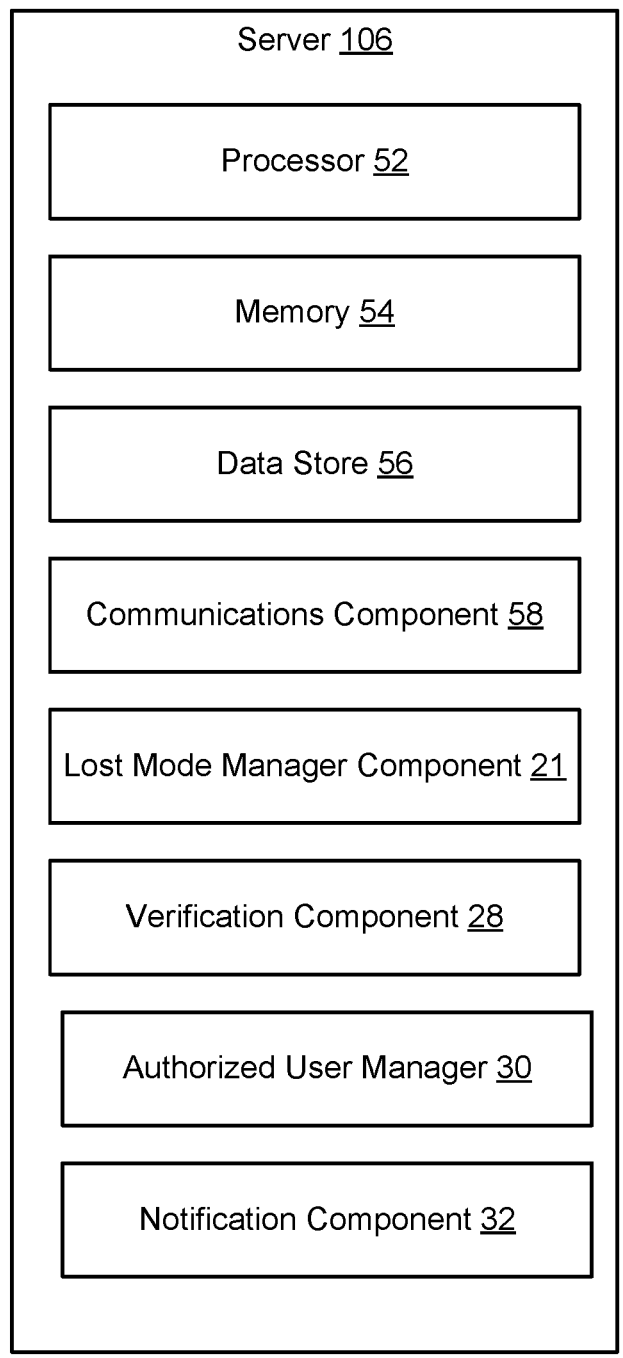
FIG. 7 is a schematic block diagram of an example server in accordance with an implementation of the present disclosure.

Referring now to FIG. 7, illustrated is an example server 106 in accordance with an implementation, including additional component details as compared to FIG. 1 and/or FIG. 2. In one example, server 106 may include processor 52 for carrying out processing functions associated with one or more of components and functions described herein. Processor 52 can include a single or multiple set of processors or multi-core processors. Moreover, processor 52 can be implemented as an integrated processing system and/or a distributed processing system.

Server 106 may further include memory 54, such as for storing local versions of applications being executed by processor 52. Memory 54 can include a type of memory usable by a computer, such as random access memory (RAM), read only memory (ROM), tapes, magnetic discs, optical discs, volatile memory, non-volatile memory, and any combination thereof.

Further, server 106 may include a communications component 58 that provides for establishing and maintaining communications with one or more parties utilizing hardware, software, and services as described herein. Communications component 58 may carry communications between components on server 106, as well as between server 106 and computer device 102 (FIG. 1) and/or server 106 and external devices, such as devices located across a communications network and/or devices serially or locally connected to server 106. For example, communications component 58 may include one or more buses, and may further include transmit chain components and receive chain components associated with a transmitter and receiver, respectively, operable for interfacing with external devices.

Additionally, server 106 may include a data store 56, which can be any suitable combination of hardware and/or software, that provides for mass storage of information, databases, and programs employed in connection with implementations described herein. For example, data store 56 may be a data repository for lost mode manager component 21 (FIG. 2), verification component 28 (FIG. 2), authorized user manager 30 (FIG. 2) and/or notification component 32 (FIG. 2). In addition, processor 52 executes lost mode manager component 21, verification component 28, authorized user manager 30 and/or notification component 32, and memory 54 or data store 56 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   memory configured to store data and instructions;
   at least one processor configured to communicate with the memory; and
   an operating system configured to communicate with the memory and the at least one processor, wherein the operating system is configured to:
   receive a lost device message including a device identifier identifying the computer device and an authorized user list including at least one user identification that identifies a user authorized to access the computer device in a lost state;
   receive a customized lock screen message to present on the computer device;
   log out existing users on the computer device and invalidate credentials of the existing users on the computer device based at least on receiving the lost device message;

activate a lock screen including presenting the customized lock screen message on the computer device and set the computer device to the lost state;
initiate a log on manager that is configured to recognize the lost state and to restrict access to the computer device to users included in the authorized user list;
receive, at the log on manager, at least one log on attempt from a user utilizing a user identification and a password;
perform, at the computer device, a first comparison of the received user identification with the at least one user identification included in the authorized user list to generate a first authentication of the received user identification when a match occurs between the received user identification and the at least one user identification included in the authorized user list;
transmit the received user identification and the password when the first authentication occurs to perform a second comparison of the received user identification and the password with stored credentials on a network based server for a second authentication of the received user identification and the password; and
grant access to the computer device based at least on the first authentication and the second authentication.

2. The computer device of claim 1, wherein the operating system is further configured to:
receive a validation message based on the second authentication that indicates whether the user is authorized to access the computer device.

3. The computer device of claim 2, wherein the validation message indicates the user is authorized to access the computer device when a match occurs between the received user identification, the password, and the stored credentials, and wherein the validation message indicates the user is unauthorized to access the computer device when the match does not occur between the received user identification, the password, and the stored credentials.

4. The computer device of claim 3, wherein the operating system is further configured to deny access to the computer device when the user identification does not match the at least one user identification included in the authorized user list or the validation message indicates the user is unauthorized to access the computer device.

5. The computer device of claim 1, wherein the authorized user list includes a plurality of user identifications that identify a plurality of users authorized to access the computer device in the lost state.

6. The computer device of claim 1, wherein the operating system is further configured to set the computer device to a found state when access is granted to the computer device.

7. The computer device of claim 1, wherein the computer device is a multi-user computer device.

8. A method for restricting access to a computer device, the method comprising:
receiving, at an operating system on the computer device, a lost device message including a device identifier identifying the computer device and an authorized user list including at least one user identification that identifies a user authorized to access the computer device in a lost state;
receiving a customized lock screen message to present on the computer device;
logging out existing users on the computer device and invalidating credentials of the existing users on the computer device based at least on receiving the lost device message;
activating a lock screen including presenting the customized lock screen message on the computer device and setting the computer device to the lost state;
initiating a log on manager that is configured to recognize the lost state and to restrict access to the computer device to users included in the authorized user list;
receiving, at the log on manager, at least one log on attempt from a user utilizing a user identification and a password;
performing, at the computer device, a first comparison of the received user identification with the at least one user identification included in the authorized user list to generate a first authentication of the received user identification when a match occurs between the received user identification and the at least one user identification included in the authorized user list;
transmitting the received user identification and the password when the first authentication occurs to perform a second comparison of the received user identification and the password with stored credentials on a network based server for a second authentication of the received user identification and the password; and
granting access to the computer device based at least on the first authentication and the second authentication.

9. The method of claim 8, wherein the method further comprises:
receiving a validation message based on the second authentication that indicates whether the user is authorized to access the computer device.

10. The method of claim 9, wherein the validation message indicates the user is authorized to access the computer device when a match occurs between the received user identification, the password, and the stored credentials, and wherein the validation message indicates the user is unauthorized to access the computer device when the match does not occur between the received user identification, the password, and the stored credentials.

11. The method of claim 10, wherein the operating system is further configured to deny access to the computer device when the user identification does not match the at least one user identification included in the authorized user list or the validation message indicates the user is unauthorized to access the computer device.

12. The method of claim 8, wherein the authorized user list includes a plurality of user identifications that identify a plurality of users authorized to access the computer device in the lost state.

13. The method of claim 8, wherein the operating system is further configured to set the computer device to a found state when access is granted to the computer device.

14. The method of claim 8, wherein the computer device is a multi-user computer device.

15. A server, comprising:
memory configured to store data and instructions;
at least one processor configured to communicate with the memory, wherein the at least one processor is further configured to:
receive a notice identifying a computer device;
receive at least one user authorized to access the computer device;
create an authorized user list including at least one user identification that identifies the at least one user authorized to access the computer device in a lost state;
create a customized lock screen message to present on the computer device;

send the customized lock screen message and a lost device message including a device identifier identifying the computer device and the authorized user list including the at least one user identification that identifies a user authorized to access the computer device in a lost state to the computer device;

receive a user identification and a password of a user requesting access to the computer device;

determine whether the user identification and the password match stored credentials associated with the at least one user identification included in the authorized user list; and send a validation message to the computer device, wherein the validation message indicates that the user is authorized to access the computer device.

16. The server of claim 15, wherein the memory is further configured to store the authorized user list.

17. The server of claim 15, wherein the authorized user list changes with received updates.

18. The server of claim 15, wherein the validation message indicates the user is unauthorized to access the computer device when the match does not occur between the received user identification, the password, and the stored credentials.

19. The server of claim 15, wherein the authorized user list includes a plurality of user identifications that identify a plurality of users authorized to access the computer device in the lost state.

* * * * *